United States Patent [19]

Takazawa et al.

[11] 4,270,851
[45] Jun. 2, 1981

[54] AUTOMATIC FILM SENSITIVITY SETTING SYSTEM FOR CAMERA

[75] Inventors: Yuzuru Takazawa; Shinji Nagaoka, both of Yotsukaido, Japan

[73] Assignee: Seiko Koki Kabushiki Kaisha, Tokyo, Japan

[21] Appl. No.: 50,127

[22] Filed: Jun. 19, 1979

[30] Foreign Application Priority Data

Jul. 18, 1978 [JP] Japan .............................. 53-98983[U]

[51] Int. Cl.³ .............................................. G03B 7/83
[52] U.S. Cl. ....................................... 354/21; 354/51
[58] Field of Search ..................... 354/21, 50, 51, 234, 354/235; 352/92

[56] References Cited

U.S. PATENT DOCUMENTS

| 3,667,363 | 6/1972 | Tanaka ................................ 354/21 |
| 3,690,232 | 9/1972 | Kodaira et al. ...................... 354/21 |
| 4,200,371 | 4/1980 | Suzuki et al. ........................ 354/21 |

*Primary Examiner*—Michael L. Gellner
*Attorney, Agent, or Firm*—Robert E. Burns; Emmanuel J. Lobato; Bruce L. Adams

[57] ABSTRACT

In an electric shutter control circuit capable of properly controlling exposure in response to information concerning exposure parameters, such as subject brightness, the trigger level of the switching circuit controlling the exposure operation is automatically set in proportion to the sensitivity of the film being used by using a specific conductive part provided on the outer surface of the film holder so that the exposure is properly controlled according to the sensitivity of the film loaded in the camera.

9 Claims, 3 Drawing Figures

AUTOMATIC FILM SENSITIVITY SETTING SYSTEM FOR CAMERA

BACKGROUND OF THE INVENTION

This invention relates to an automatic film sensitivity setting system for a camera provided with an electric shutter system.

There have been introduced a variety of methods for electrically setting film exposure parameters relative to the brightness of a subject to be photographed. Other information other than brightness influencing the exposure such as the sensitivity of the film, must be introduced to the exposure control system by some means, for instance, by adjusting the size of an aperture disposed in front of the light receiving element in proportion to the film sensitivity or by selectively changing-over capacitors constituting a time determining integrating module corresponding to the film sensitivity. These systems require a manual setting operation by the operator and which is often forgotton causing a faulty photographing operation.

This invention provides an automatic film sensitivity setting system including a system capable of selectively determining a trigger level in proportion to the sensitivity of the film using a specific conductive part arranged to represent the film sensitivity and provided on the outer surface of the film holder.

DETAILED DESCRIPTION

Figure 1:
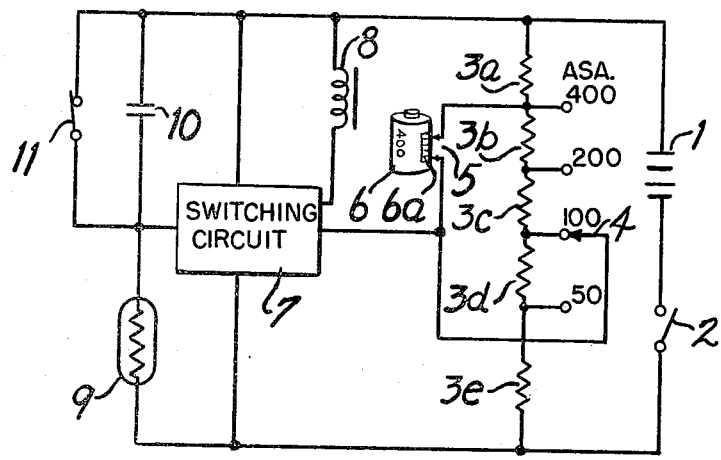
FIG. 1 is a schematic diagram of an embodiment of the automatic film sensitivity setting system according to the present invention.

Referring to FIG. 1, reference numerals indicate the following corresponding elements of the illustrated structure: (1) power source, (2) a main switch, (3a)–(3e) bleeder resistances, (4) a film sensititivity selector switch, (5) a patrone switch comprising a conductive part (6a) provided on the outer surface of a patrone (6), (7) a switching circuit for controlling the exposure, (8) an electromagnet for controlling the shutter and connected to the output of the switching circuit (7), (9) a photoelectric element such as CdS that transduces the subject brightness into an electric signal, (10) a capacitor constituting a timing circuit together with the photoelectric element (9) and (11) a timing switch connected with the capacitor (10) in parallel and interlocked with shutter operation.

Figure 2:
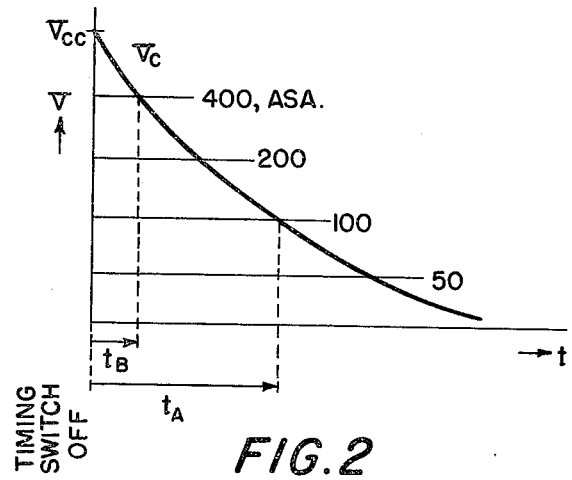
FIG. 2 is a diagram for explaining the function of the system of FIG. 1.

When the main switch (2) is closed, the electromagnet (8) is excited while the trigger level of the switching circuit (7) is determined by the film sensitivity selector switch (4) and the bleeder resistances (3a)–(3e). In FIG. 2 lines indicated by 400, 200, 100 and 50 show the voltage levels corresponding to film sensitivities of ASA 400, 200, 100 and 50, respectively.

Interlocking with the shutter operation, the timing switch (11) is opened when the shutter blade is opened and the capacitor (10) is charged through the photoelectric element (9). The mode between the capacitor (10) and the photoelectric element (9) is connected to the input of the switching circuit (7). The voltage of this intermediate point changes as illustrated by a curve (Vc) in FIG. 2. When the systen is set corresponding to the film sensitivity of ASA 100 for instance, the switching circuit (7) switches to deenergize the electromagnet (8) when the input voltage (Vc) reached the voltage level corresponding to ASA 100. The exposure time is (tA) as indicated in FIG. 2. When a film of ASA 400 is loaded, the patrone switch (5) is closed by the conductive part or element (6a) provided on the patrone to short-circuit the ASA 400 terminal to the trigger input of the switching circuit (7), thus a trigger level corresponding to ASA 400 is given to the switching circuit independently of the position of the film sensitivity selector switch (4). This trigger level is indicated by ASA in FIG. 2 and is equivalent to the voltage level for ASA 400. The exposure time is shown as (tB). The plurality of resistors 3a–3e, the plurality of contacts each connected to a respective node defined by a connected pair of the resistors 3a–3e, and the manually movable contact comprising the film sensitivity selector switch together comprise first means manually operable for selecting the value of the trigger signal applied to the switching circuit 7. A first contact connected to the node defined by resistors 3a and 3b, and a second contact connected to the movable contact and which is positioned relative to the first contact for contacting the electrically conductive element 6a of the film holder 6, together define second means cooperative with the camera film holder for setting the value of the trigger signal to a predetermined value and for rendering the first means inoperative, when the first and the second contacts cooperate with the film holder by contacting the conductive element 6a thereof. The first means and the second means just described together comprise trigger signal generating means for generating a trigger signal and for applying the trigger signal to the switching circuit 7.

Figure 3:
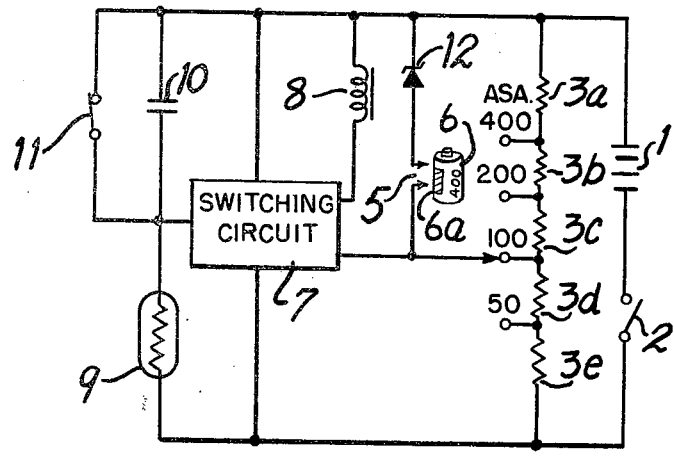
FIG. 3 is a schematic diagram of another embodiment according to the invention.

Referring now to FIG. 3, like refernece numerals as in FIG. 1 indicate like components having the same function as in FIG. 1.

Reference numeral (12) designates a constant-voltage element such as a zener diode. When the camera is loaded with an ASA 400 film, the patrone switch (5) is closed in the same manner as explained hereinbefore so that the zener diode is connected between the positive terminal of the power source and the film sensitivity selector switch (4). In this state, The trigger level of the switching circuit (7) is constant independently of the position of the film sensitivity selector switch (4). The trigger level is shown by power source voltage (Vcc)—zener voltage (Vz). When the system is constructed to provide a condition that the voltage Vcc-Vz is equal to the trigger level corresponding to ASA 400, the system is automatically set to provide a proper exposure time corresponding to the film sensitivity of ASA 400 when an ASA 400 film is loaded.

It will be well understood from what has been described hereinbefore that the automatic film sensitivity setting system according to the present invention automatically sets a trigger level of the switching circuit controlling the exposure corresponding to the sensitivity of the film by using a specific conductive part provided on the outer surface of the film holder thereby eliminating manual film sensitivity setting operations as in the conventional systems and that this invention can be combined with the conventional systems with only a little modification of the conventional exposure control circuit.

We claim:
1. In a camera exposure control circuit of the type including a switching circuit responsive to an electrical brightness signal representative of the brightness of a subject to be photographed and responsive to an input trigger signal for controlling exposure according to the brightness signal and the trigger signal, and trigger signal generating means for generating the trigger signal and for applying the trigger signal to the switching circuit, the improvement comprising: said trigger signal generating means comprising first means manually operable for selecting the value of the trigger signal generated by said trigger signal generating means; and said trigger signal generating means comprising second means cooperative with a camera film holder for setting the value of the trigger signal generated by said trigger signal generating means to a predetermined value, and said second means being effective to render said first means inoperative when said second means cooperates with a film holder to determine the value of the trigger signal.

2. In a camera exposure control circuit according to claim 1, the combination of said second means of said trigger circuit, and a camera film holder having thereon a conductive element cooperative with said second means for enabling said second means to determine the value of said trigger signal.

3. In a camera exposure control circuit according to claim 1, wherein said trigger signal generating means is effective for generating a trigger signal representative of film sensitivity.

4. In a camera exposure control circuit according to claim 1, 2, or 3, said first means comprising: a plurality of resistors connected in series, a plurality of contacts each connected to a respective node defined by a connected pair of said resistors; a manually movable contact connected to said switching circuit for applying the trigger signal to said switching circuit and manually movable for making contact with selected ones of said plurality of contacts for receiving different value trigger signals from different ones of said plurality of contacts; and said plurality of resistors connected in series receiving in use an electrical potential thereacross for devoloping different value trigger signals at respective ones of said contacts connected to said plurality of resistors connected in series.

5. In a camera exposure control circuit according to claim 4, said second means comprising: a first contact connected to one of said plurality of contacts, a second contact connected to said movable contact, and said first and second contacts positioned for contacting an electrically conductive element of a film holder in use so that the electrically conductive element electrically connects said first and second elements to determine the value of the trigger signal irrespective of the setting of said movable contact.

6. In a camera exposure control circuit according to claim 4, said second means comprising: a constant voltage circuit element for developing thereacross a constant voltage, in operation; a first contact connected to said constant voltage circuit element; a second contact connected to said movable contact; and said first and second contacts positioned for contacting an electrically conductive element of a film holder in use so that the electrically conductive element electrically connects said first and second elements to apply the constant voltage developed across said constant voltage circuit element to said movable contact irrespective of the setting of said movable contact.

7. A camera exposure control circuit, comprising: a trigger circuit receptive in use of an electrical brightness signal and an electrical threshold signal for developing an output signal to terminate exposure when the value of the electrical brightness signal reaches a value determined by the electrical threshold signal; brightness signal generating means, comprising a photoelectric element receptive of light from a subject to be photographed and a capacitor charged by an electrical signal generated by said photoelectric element, for generating a time-varying electrical signal having a magnitude determined by the brightness of the subject to be photographed; a plurality of resistors connected together and receptive in use of an electrical potential for developing in use voltage drops across the respective resistors comprising said plurality of resistors, wherein the values of said plurality of resistors are selected for developing across said resistors respective voltage drops having values corresponding to different values of film sensitivity; means manually operable for applying a voltage developed across a selected resistor of said plurality of resistors as the trigger signal to said switching circuit; a pair of contacts positioned proximate each other and bridgeable in use for establishing an electrical connection therebetween, and a first of said pair of contacts connected to said movable contact and the second of said pair of contacts connected to receive an electrical potential in use for applying the electrical potential received by the second contact to said switching circuit as the trigger signal irrespective of the position of said movable contacts, when said pair of contacts are bridged.

8. In a camera exposure control circuit according to claim 7, the improvement further comprising a constant voltage circuit element connected to the second of said pair of contacts for applying in use a constant voltage to said second contact.

9. In a camera exposure control circuit according to claim 7 or 8, the improvement further comprising a film holder having thereon a conductive element dimensioned for bridging said pair of contacts for establishing an electrical connection therebetween.

* * * * *